(12) United States Patent
Mazzarese

(10) Patent No.: US 9,287,959 B2
(45) Date of Patent: Mar. 15, 2016

(54) METHOD AND SYSTEM FOR QUANTIZED FEEDBACK RATE ADAPTATION IN A COMMUNICATION SYSTEM

(71) Applicant: Huawei Technologies Co., Ltd., Shenzhen, Guangdong (CN)

(72) Inventor: David Mazzarese, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 13/670,097

(22) Filed: Nov. 6, 2012

(65) Prior Publication Data

US 2013/0058386 A1    Mar. 7, 2013

Related U.S. Application Data

(63) Continuation of application No. PCT/CN2010/072526, filed on May 7, 2010.

(51) Int. Cl.
*H04B 7/02* (2006.01)
*H04L 1/02* (2006.01)
*H04B 7/06* (2006.01)

(52) U.S. Cl.
CPC .............. *H04B 7/0639* (2013.01); *H04B 7/063* (2013.01); *H04B 7/0647* (2013.01)

(58) Field of Classification Search
None
See application file for complete search history.

(56) References Cited

U.S. PATENT DOCUMENTS

| 2008/0219370 | A1 | 9/2008 | Onggosanusi et al. | |
| 2009/0080549 | A1* | 3/2009 | Khan et al. | 375/260 |
| 2009/0109873 | A1 | 4/2009 | Shen et al. | |
| 2009/0207784 | A1 | 8/2009 | Lee et al. | |
| 2009/0252091 | A1* | 10/2009 | Tang et al. | 370/328 |
| 2010/0202372 | A1* | 8/2010 | Chun et al. | 370/329 |
| 2011/0059703 | A1 | 3/2011 | Hugl et al. | |
| 2012/0052895 | A1* | 3/2012 | Clerckx et al. | 455/509 |
| 2013/0114427 | A1* | 5/2013 | Maattanen | H04B 7/024 370/252 |
| 2013/0114655 | A1* | 5/2013 | Gomadam | H04L 1/0031 375/219 |
| 2013/0114656 | A1* | 5/2013 | Sayana | H04B 7/024 375/219 |

FOREIGN PATENT DOCUMENTS

| CN | 101425830 A | 5/2009 |
| WO | WO 2009/040775 A2 | 4/2009 |

OTHER PUBLICATIONS

Extended European Search Report in corresponding European Patent Application No. 10850964.7 (Apr. 2, 2013).

(Continued)

*Primary Examiner* — Shuwang Liu
*Assistant Examiner* — Gina McKie
(74) *Attorney, Agent, or Firm* — Leydig, Voit & Mayer, Ltd.

(57) ABSTRACT

The present invention relates to a method for adapting the feedback rate of a quantized representation of the propagation channel in a capacity-limited feedback channel. The method comprises obtaining a reference signal from an access point; deriving a rank indication, a codebook subset selection indication and a precoding matrix index based on the obtained reference signal; sending a first feedback message conveying the rank indication and the codebook subset selection indication, and sending a second feedback message conveying the precoding matrix index, to the access point; and receiving, from the access point, data precoded by a matrix derived based on the rank indication, the codebook subset selection indication and the precoding matrix index.

4 Claims, 18 Drawing Sheets

(56) References Cited

OTHER PUBLICATIONS

Khojastepour et al., "Quantized Multi-rank Beamforming for MIMO Systems," 2008, IEEE, New York, New York.
International Search Report in corresponding International Patent Application No. PCT/CN2010/072526 (Feb. 10, 2011).
Written Opinion of the International Searching Authority in corresponding International Patent Application No. PCT/CN2010/072526 (Feb. 10, 2011).
"TS 136 213—LTE; Evolved Universal Terrestrial Radio Access (E-UTRA); Physical Layer Procedures (3GPP TS 36.213 Version 8.8.0 Release 8)," Oct. 2009, 3GPP, Valbonne, France.
"TS 36.212—3$^{rd}$ Generation Partnership Project; Technical Specification Group Radio Access Network; Evolved Universal Terrestrial Radio Access (E-UTRA); Multiplexing and Channel Coding (Release 8)," Sep. 2007, V8.0.0, 3GPP, Valbonne, France.
"TS 36.212—3$^{rd}$ Generation Partnership Project; Technical Specification Group Radio Access Network; Evolved Universal Terrestrial Radio Access (E-UTRA); Multiplexing and Channel Coding (Release 9)," Sep. 2010, V9.3.0, 3GPP, Valbonne, France.
"TS 36.213—3$^{rd}$ Generation Partnership Project; Technical Specification Group Radio Access Network; Evolved Universal Terrestrial Radio Access (E-UTRA); Physical Layer Procedures (Release 9)," Sep. 2010, V9.3.0, 3GPP, Valbonne, France.
"P802.16m/D5—Draft Amendment to IEEE Standard for Local and Metropolitan Area Networks; Part 16: Air Interface for Fixed and Mobile Broadband Wireless Access Systems; Advanced Air Interface," Apr. 2010, IEEE, Reston, Virginia.
"R1-101742—Further Refinements of Feedback Framework," 3GPP TSG-RAN WG1 #60bis, Apr. 12-16, 2010, 3GPP, Valbonne, France.
"R1-101959—Further Results of DL 8TX Codebook," 3GPP TSG RAN WG1#60bis, Apr. 12-16, 2010, 3GPP, Valbonne, France.
"R1-102560—Refinement on UE Feedback," 3GPP TSG RAN WG1#60bis, Apr. 12-16, 2010, 3GPP, Valbonne, France.

* cited by examiner

| Codeword information $o_0^{RI}, o_1^{RI}, o_2^{RI}$ | Polarization information (PI) | Rank information (RI) |
|---|---|---|
| 0, 0, 0 | Single polarization (ULA) | 1 |
| 0, 0, 1 | Single polarization (ULA) | 2 |
| 0, 1, 0 | Single polarization (ULA) | 3 |
| 0, 1, 1 | Single polarization (ULA) | 4 |
| 1, 0, 0 | Dual polarization (Xpol) | 1 |
| 1, 0, 1 | Dual polarization (Xpol) | 2 |
| 1, 1, 0 | Dual polarization (Xpol) | 3 |
| 1, 1, 1 | Dual polarization (Xpol) | 4 |

Fig. 1

| Codeword information $o_0^{RI}$, $o_1^{RI}$, $o_2^{RI}$ | Polarization information (PI) | Rank information (RI) |
|---|---|---|
| 0, 0, 0 | Single polarization (ULA) | 1 |
| 0, 0, 1 | Dual polarization (Xpol) | 1 |
| 0, 1, 0 | Single polarization (ULA) | 2 |
| 0, 1, 1 | Dual polarization (Xpol) | 2 |
| 1, 0, 0 | Single or dual polarization | 3 |
| 1, 0, 1 | Single or dual polarization | 4 |
| 1, 1, 0 | Reserved | Reserved |
| 1, 1, 1 | Reserved | Reserved |

Fig. 2

| Codeword information $o_0^{RI}, o_1^{RI}, o_2^{RI}$ | Polarization information (PI) | Rank information (RI) |
| --- | --- | --- |
| 0, 0, 0 | Single polarization (ULA) | 1 |
| 0, 0, 1 | Dual polarization (Xpol) | 1 |
| 0, 1, 0 | Single polarization (ULA) | 2 |
| 0, 1, 1 | Dual polarization (Xpol) | 2 |
| 1, 0, 0 | Single or dual polarization | 3 |
| 1, 0, 1 | Single or dual polarization | 4 |
| 1, 1, 0 | Single or dual polarization | 5 or 6 |
| 1, 1, 1 | Single or dual polarization | 7 or 8 |

Fig. 3

| Codeword information $o_0^{RI}, o_1^{RI}, o_2^{RI}$ | Polarization information (PI) | Rank information (RI) |
|---|---|---|
| 0, 0, 0 | Not available | 1 |
| 0, 0, 1 | Not available | 2 |
| 0, 1, 0 | Not available | 3 |
| 0, 1, 1 | Not available | 4 |
| 1, 0, 0 | Not available | 5 |
| 1, 0, 1 | Not available | 6 |
| 1, 1, 0 | Not available | 7 |
| 1, 1, 1 | Not available | 8 |

Fig. 4

| Codeword information $o_0^{RI}, o_1^{RI}, o_2^{RI}, o_3^{RI}$ | Polarization information (PI) | Rank information (RI) |
|---|---|---|
| 0, 0, 0, 0 | Single polarization (ULA) | 1 |
| 0, 0, 0, 1 | Dual polarization (Xpol) | 2 |
| 0, 0, 1, 0 | Single polarization (ULA) | 3 |
| 0, 0, 1, 1 | Dual polarization (Xpol) | 4 |
| 0, 1, 0, 0 | Single polarization (ULA) | 5 |
| 0, 1, 0, 1 | Dual polarization (Xpol) | 6 |
| 0, 1, 1, 0 | Single polarization (ULA) | 7 |
| 0, 1, 1, 1 | Dual polarization (Xpol) | 8 |
| 1, 0, 0, 0 | Single polarization (ULA) | 1 |
| 1, 0, 0, 1 | Dual polarization (Xpol) | 2 |
| 1, 0, 1, 0 | Single polarization (ULA) | 3 |
| 1, 0, 1, 1 | Dual polarization (Xpol) | 4 |
| 1, 1, 0, 0 | Single polarization (ULA) | 5 |
| 1, 1, 0, 1 | Dual polarization (Xpol) | 6 |
| 1, 1, 1, 0 | Single polarization (ULA) | 7 |
| 1, 1, 1, 1 | Dual polarization (Xpol) | 8 |

Fig. 5

| Codeword information $o_0^{RI}$, $o_1^{RI}$, $o_2^{RI}$ | Polarization information (PI) | Rank information (RI) |
|---|---|---|
| 0, 0, 0 | Single polarization (ULA) | 1 |
| 0, 0, 1 | Single polarization (ULA) | 2 |
| 0, 1, 0 | Single polarization (ULA) | 3 |
| 0, 1, 1 | Single polarization (ULA) | 4 |
| 1, 0, 0 | Dual polarization (Xpol) | 1 |
| 1, 0, 1 | Dual polarization (Xpol) | 2 |
| 1, 1, 0 | Dual polarization (Xpol) | 3 |
| 1, 1, 1 | Dual polarization (Xpol) | 4 |

Fig. 6

| Codeword information $o_0^{RI}, o_1^{RI}, o_2^{RI}$ | Polarization information (PI) | Rank information (RI) |
|---|---|---|
| 0, 0, 0 | Single polarization (ULA) | 1 |
| 0, 0, 1 | Dual polarization (Xpol) | 1 |
| 0, 1, 0 | Single polarization (ULA) | 2 |
| 0, 1, 1 | Dual polarization (Xpol) | 2 |
| 1, 0, 0 | Single or dual polarization | 3 |
| 1, 0, 1 | Single or dual polarization | 4 |
| 1, 1, 0 | Reserved | Reserved |
| 1, 1, 1 | Reserved | Reserved |

Fig. 7

| Codeword information $o_0^{RI}$, $o_1^{RI}$, $o_2^{RI}$ | Precoder information (PI) | Rank information (RI) |
|---|---|---|
| 0, 0, 0 | $W_1$ is the recommended precoder | 1 |
| 0, 0, 1 | $g(W_1, W_2)$ is the recommended precoder | 1 |
| 0, 1, 0 | $W_1$ is the recommended precoder | 2 |
| 0, 1, 1 | $g(W_1, W_2)$ is the recommended precoder | 2 |
| 1, 0, 0 | $W_1$ is the recommended precoder | 3 |
| 1, 0, 1 | $g(W_1, W_2)$ is the recommended precoder | 3 |
| 1, 1, 0 | $W_1$ is the recommended precoder | 4 |
| 1, 1, 1 | $g(W_1, W_2)$ is the recommended precoder | 4 |

Fig. 8

| Codeword information $o_0^{RI}, o_1^{RI}, o_2^{RI}$ | Polarization information (PI) | Rank information (RI) |
|---|---|---|
| 0, 0, 0 | Single polarization (ULA) | 1 |
| 0, 0, 1 | Dual polarization (Xpol) | 1 |
| 0, 1, 0 | Single polarization (ULA) | 2 |
| 0, 1, 1 | Dual polarization (Xpol) | 2 |
| 1, 0, 0 | Single or dual polarization | 3 |
| 1, 0, 1 | Single or dual polarization | 4 |
| 1, 1, 0 | Single or dual polarization | 5 or 6 |
| 1, 1, 1 | Single or dual polarization | 7 or 8 |

Fig. 9

| Codeword information $o_0^{RI}, o_1^{RI}, o_2^{RI}$ | Polarization information (PI) | Rank information (RI) |
|---|---|---|
| 0, 0, 0 | Not available | 1 |
| 0, 0, 1 | Not available | 2 |
| 0, 1, 0 | Not available | 3 |
| 0, 1, 1 | Not available | 4 |
| 1, 0, 0 | Not available | 5 |
| 1, 0, 1 | Not available | 6 |
| 1, 1, 0 | Not available | 7 |
| 1, 1, 1 | Not available | 8 |

Fig. 10

| Codeword information $o_0^{RI}, o_1^{RI}, o_2^{RI}, o_3^{RI}$ | Polarization information (PI) | Rank information (RI) |
| --- | --- | --- |
| 0, 0, 0, 0 | Single polarization (ULA) | 1 |
| 0, 0, 0, 1 | Dual polarization (Xpol) | 2 |
| 0, 0, 1, 0 | Single polarization (ULA) | 3 |
| 0, 0, 1, 1 | Dual polarization (Xpol) | 4 |
| 0, 1, 0, 0 | Single polarization (ULA) | 5 |
| 0, 1, 0, 1 | Dual polarization (Xpol) | 6 |
| 0, 1, 1, 0 | Single polarization (ULA) | 7 |
| 0, 1, 1, 1 | Dual polarization (Xpol) | 8 |
| 1, 0, 0, 0 | Single polarization (ULA) | 1 |
| 1, 0, 0, 1 | Dual polarization (Xpol) | 2 |
| 1, 0, 1, 0 | Single polarization (ULA) | 3 |
| 1, 0, 1, 1 | Dual polarization (Xpol) | 4 |
| 1, 1, 0, 0 | Single polarization (ULA) | 5 |
| 1, 1, 0, 1 | Dual polarization (Xpol) | 6 |
| 1, 1, 1, 0 | Single polarization (ULA) | 7 |
| 1, 1, 1, 1 | Dual polarization (Xpol) | 8 |

Fig. 11

| Codeword information $o_0^{RI}, o_1^{RI}, o_2^{RI}$ | Precoder information (PI) | Rank information (RI) |
|---|---|---|
| 0, 0, 0 | Only $W_1$ is reported in the PMI | 1 |
| 0, 0, 1 | $W_1$ and $W_2$ are reported in the PMI | 1 |
| 0, 1, 0 | Only $W_1$ is reported in the PMI | 2 |
| 0, 1, 1 | $W_1$ and $W_2$ are reported in the PMI | 2 |
| 1, 0, 0 | Only $W_1$ is reported in the PMI | 3 |
| 1, 0, 1 | $W_1$ and $W_2$ are reported in the PMI | 3 |
| 1, 1, 0 | Only $W_1$ is reported in the PMI | 4 |
| 1, 1, 1 | $W_1$ and $W_2$ are reported in the PMI | 4 |

Fig. 12

| Codeword information $o_0^{RI}, o_1^{RI}, o_2^{RI}$ | Precoder information (PI) | Rank information (RI) |
|---|---|---|
| 0, 0, 0 | Only $W_1$ is reported in the PMI | 1 |
| 0, 0, 1 | $W_1$ and $W_2$ are reported in the PMI | 1 |
| 0, 1, 0 | Only $W_1$ is reported in the PMI | 2 |
| 0, 1, 1 | $W_1$ and $W_2$ are reported in the PMI | 2 |
| 1, 0, 0 | $W_1$ and $W_2$ are reported in the PMI | 3 |
| 1, 0, 1 | $W_1$ and $W_2$ are reported in the PMI | 4 |
| 1, 1, 0 | $W_1$ and $W_2$ are reported in the PMI | 5 or 6 |
| 1, 1, 1 | $W_1$ and $W_2$ are reported in the PMI | 7 or 8 |

Fig. 13

| Codeword information $o_0^{RI}$, $o_1^{RI}$, $o_2^{RI}$ | Precoder information (PI) | Rank information (RI) |
|---|---|---|
| 0, 0, 0 | $W_1$ is the recommended precoder | 1 |
| 0, 0, 1 | $g(W_1,W_2)$ is the recommended precoder | 1 |
| 0, 1, 0 | $W_1$ is the recommended precoder | 2 |
| 0, 1, 1 | $g(W_1,W_2)$ is the recommended precoder | 2 |
| 1, 0, 0 | $W_1$ is the recommended precoder | 3 |
| 1, 0, 1 | $g(W_1,W_2)$ is the recommended precoder | 3 |
| 1, 1, 0 | $W_1$ is the recommended precoder | 4 |
| 1, 1, 1 | $g(W_1,W_2)$ is the recommended precoder | 4 |

Fig. 14

| Codeword information $o_0^{RI}, o_1^{RI}, o_2^{RI}$ | Precoder information (PI) | Rank information (RI) |
|---|---|---|
| 0, 0, 0 | $W_1$ is the recommended precoder | 1 |
| 0, 0, 1 | $g(W_1,W_2)$ is the recommended precoder | 1 |
| 0, 1, 0 | $W_1$ is the recommended precoder | 2 |
| 0, 1, 1 | $g(W_1,W_2)$ is the recommended precoder | 2 |
| 1, 0, 0 | $g(W_1,W_2)$ is the recommended precoder | 3 |
| 1, 0, 1 | $g(W_1,W_2)$ is the recommended precoder | 4 |
| 1, 1, 0 | $g(W_1,W_2)$ is the recommended precoder | 5 or 6 |
| 1, 1, 1 | $g(W_1,W_2)$ is the recommended precoder | 7 or 8 |

Fig. 15

| Bitmap {bit1,bit2} | Receiver's assumption on recommended precoder |
|---|---|
| {0,0} | No or pre-defined precoder (open-loop MIMO) |
| {0,1} | $W=W_1$ |
| {1,0} | $W=W_2$ |
| {1,1} | $W=g(W_1,W_2)$ |

Fig. 16

| Codeword information $o_0^{RI}, o_1^{RI}, o_2^{RI}$ | Co-phasing factor information | RI |
|---|---|---|
| 0, 0, 0 | $e^{j\phi_1}$ | 1 |
| 0, 0, 1 | $e^{j\phi_2}$ | 1 |
| 0, 1, 0 | $e^{j\phi_1}$ | 2 |
| 0, 1, 1 | $e^{j\phi_2}$ | 2 |
| 1, 0, 0 | $e^{j\phi_1}$ | 3 |
| 1, 0, 1 | $e^{j\phi_2}$ | 3 |
| 1, 1, 0 | $e^{j\phi_1}$ | 4 |
| 1, 1, 1 | $e^{j\phi_2}$ | 4 |

Fig. 17

| Codeword information $o_0^{RI}, o_1^{RI}, o_2^{RI}$ | Co-phasing factor information | RI |
|---|---|---|
| 0, 0, 0 | $e^{j\phi_1}$ | 1 |
| 0, 0, 1 | $e^{j\phi_2}$ | 1 |
| 0, 1, 0 | $e^{j\phi_1}$ | 2 |
| 0, 1, 1 | $e^{j\phi_2}$ | 2 |
| 1, 0, 0 | Not available | 3 |
| 1, 0, 1 | Not available | 4 |
| 1, 1, 0 | Not available | 5 or 6 |
| 1, 1, 1 | Not available | 7 or 8 |

METHOD AND SYSTEM FOR QUANTIZED FEEDBACK RATE ADAPTATION IN A COMMUNICATION SYSTEM

CROSS-REFERENCE TO RELATED APPLICATIONS

This application is a continuation of International Patent Application No. PCT/CN2010/072526, filed on May 7, 2010, which is hereby incorporated by reference in entirety thereof.

FIELD OF TECHNOLOGY

The present invention relates to the field of radio communication systems, and in particular to a method for adapting the feedback rate of a quantized representation of the propagation channel in a capacity-limited feedback channel.

BACKGROUND OF THE INVENTION

In MIMO OFDMA cellular systems, such as 3GPP LTE or IEEE 802.16e/m, closed-loop MIMO precoding is defined to enable high throughput downlink transmissions to fixed and nomadic users. Feedback information is obtained at the transmitter via the report a precoding matrix index (PMI) from a receiver to a transmitter. This PMI is used to represent a matrix in a codebook (a set of matrices), and it is used at the transmitter to derive a downlink precoder.

Simple codebook structures are used in the first generation of MIMO OFDMA systems, such that the PMI can be represented with a few bits. Small codebooks achieve a coarse quantization of the spatial channel. For example in 3GPP LTE Release 8, a 4-bit codebook is defined and the 4-bit PMI can be reported via a capacity-limited feedback channel called PUCCH [1, 2]. Precoding matrices are defined for each possible transmission rank, which determines the size of the precoding matrix. The overall codebook is a set of matrices for each rank. The feedback of the PMI thus consists of a rank indication (RI) and a PMI for the codebook subset of the given rank RI. Since the rank of the propagation channel varies slowly in comparison with fast fading over which the PMI is adapted, the rank indication is reported with a longer period than the PMI.

More importantly, since the rank indication remains valid during several reports of the PMI, it must be encoded with a better error protection code in order to ensure that consecutive PMI reports are not invalidated by one erroneous RI report. In general, this is naturally ensured by the fact that the rank can take values in a limited range, such as {1, 2, 3, 4} in LTE Rel-8, due to the limitation to a maximum of 4 antennas at the transmitter and 4 antennas at the receiver. Thus the RI can be represented by 2 bits. Since the PMI is in general reported along with a channel quality indication (CQI) that represents the channel quality assuming transmit precoding with the reported PMI, the total size of the feedback message that contains the PMI+CQI is larger than the 4 bits used to represent just the PMI. The message size will be 8 to 11 bits with one to two CQIs, respectively, in LTE Rel-8. The PUCCH being transmitted in a fixed-size time-frequency resource with a fixed modulation, the 2 bits of RI that are reported individually are naturally better protected than the 8 or 11 bits of PMI+CQI that are jointly reported, since the 2 bits of RI enjoy a lower error-correction encoding rate.

Enhancements of the feedback for closed-loop precoding beyond the simple 4-bit codebook or for larger transmit antenna array sizes would require more complex codebook structures, as well as a larger codebook size. Naturally, the feedback mechanisms should be designed accordingly, in order to take advantage of enhanced codebook properties, and to ensure smooth operation of the feedback in order to avoid disrupting propagation of feedback errors. It can be easily understood that increasing the size of the PMI without changing the reporting mechanisms could lead to situation where a very large PMI would lead to a very large feedback message, which would often be received in error. In order to cope with this situation, it would be desirable to better balance the feedback load between the RI and PMI+CQI reports. Moreover, the PUCCH design in LTE Rel-8 can accommodate a maximum of 13 information bits. If the size of the PMI was increased beyond 6 bits, one would either need to entirely re-design the feedback channel or increase the information load of the RI report. In would also be desirable to maintain the possibility of the existing system operation while allowing the operation of the advanced reporting format, based on the same feedback channel physical structure.

A first type of enhanced codebook contains matrices that provide a quantization of the MIMO propagation channel between an array of transmitting antennas and an array of receiving antennas. Due to the wide range of deployed transmit antenna arrays, such a codebook should effectively quantize single-polarized channels as well as dual-polarized channels. This type of codebook naturally contains one set of matrices that quantize the single-polarized space, and a second set of matrices that quantize the dual-polarized space, as shown in FIG. 1. Note that these two sets may have common elements. An example of such a codebook can be found in 3GPP LTE Rel-8 specifications [1].

Another example of such a codebook is given in [3], where the matrices take the form:

$$W = W_{MI1}^{(1)} W_{MI2}^{(2)}$$

The inner precoder $W_{MI1}^{(1)}$ has a block diagonal structure $$W_{MI1}^{(1)} = \begin{bmatrix} \tilde{W}_{MI1}^{(1)} & 0 \\ 0 & \tilde{W}_{MI1}^{(1)} \end{bmatrix}$$

For rank 1, the precoder could be formed as $$W = \begin{bmatrix} \tilde{W}_{MI1}^{(1)} & 0 \\ 0 & \tilde{W}_{MI1}^{(1)} \end{bmatrix} \begin{bmatrix} 1 \\ \alpha \end{bmatrix}, \alpha \in \{1, -1, j, -j\}$$

The rank 2 case would follow similarly as $$W = \begin{bmatrix} \tilde{W}_{MI1}^{(1)} & 0 \\ 0 & \tilde{W}_{MI1}^{(1)} \end{bmatrix} \begin{bmatrix} 1 & 1 \\ \alpha & -\alpha \end{bmatrix}, \alpha \in \{1, j\}$$

The second precoder represents a co-phasing factor that takes care of short-term channel variations and can be made to adjust the structure of the overall precoder W to match either a single-polarized linear uniform array (ULA) or a cross-polarized array at the transmitter.

There is therefore a need in the art for efficient techniques for adapting the feedback rate in capacity-limited channels for reporting channel state information with codebook-based quantization, which is proposed in this disclosure.

SUMMARY OF THE INVENTION

The present invention relates to a method for adapting the feedback rate of a quantized representation of the propagation channel in a capacity-limited feedback channel in a wireless communication system. The wireless communication system comprises an access point (the transmitter), which can be understood to be a base station or eNodeB, and at least one user terminal (the receiver), which can be understood to be a mobile station or user equipment (UE). At least one reference signal to the user terminal and a feedback channel from the user terminal allow the transmission from the access point using codebook-based precoding when the access point is equipped with multiple transmit antennas.

A method for performing quantized feedback rate adaptation in a wireless communication system, comprising:

obtaining a reference signal from an access point;

deriving a rank indication, a codebook subset selection indication and a precoding matrix index based on the obtained reference signal;

sending a first feedback message conveying the rank indication and the codebook subset selection indication, and sending a second feedback message conveying the precoding matrix index, to the access point; and receiving, from the access point, data precoded by a matrix derived based on the rank indication, the codebook subset selection indication and the precoding matrix index.

A user terminal, comprising:

a deriving unit, configured to derive a rank indication, a codebook subset selection indication and a precoding matrix index based on the obtained reference signal from an access point;

a sending unit, configured to send a first feedback message conveying the rank indication and the codebook subset selection indication, and send a second feedback message conveying the precoding matrix index, to the access point; and a receiving unit, configured to receive from the access point, data precoded by a matrix derived based on the rank indication, the codebook subset selection indication and the precoding matrix index.

The method defines a format for the feedback of a first message contained in a first report including at least a rank indication and a first codebook index part, and at least one second message contained in at least one report including a second codebook index part. The rank indication is jointly encoded with a first part of the codebook index in a first message. Reporting a first part of the codebook acts as a type of codebook subset selection within the codebook of a given rank. This subset selection is performed by the receiver. The first report enjoys better error protection than the feedback of the other part of the codebook index, which is reported in a second message contained in a second report. The first report pertains to static or long-term properties of the propagation channel, such as polarizations of the elements of the transmit antenna array, or slowly drifting co-phasing factors, as exemplified by double or multiple codebook feedback structures.

Certain embodiments of the present invention describe methods for splitting codebook information in a physically meaningful way, such that a relevant part (herein referred to as the first part) of the codebook is reported along with the RI in a first report, while the other part (herein referred to as the second part) of the codebook is reported in the PMI along with the CQI in at least one second report. The method is such that the first report enjoys better error protection than the second report. The first part of the codebook represents some static or long-term statistics of the propagation channel, while the second part captures the remaining parts of the channel statistics, including adaptation to fast fading. In certain embodiments, efficient encoding of the RI with the first part of the codebook is designed in a way compatible with 3GPP LTE.

BRIEF DESCRIPTION OF THE DRAWINGS

FIG. 1 shows a codebook as a union of two sets;

FIG. 2 shows a flowchart of a method for performing quantized feedback rate adaptation in an embodiment of the present invention;

FIG. 3 shows the 3-bit PUCCH report type 3a according to an first embodiment of the present invention;

FIG. 4 shows the hybrid 2-bit or 3-bit PUCCH report type 3b according to the first embodiment of the present invention;

FIG. 5 shows the encoding of 3-bit RI according to the first embodiment of the present invention;

FIG. 6 shows RI mapping for PUCCH report type 3a or 3b according to the first embodiment of the present invention;

FIG. 7 shows RI mapping for PUCCH report type 3a or 3b according to the first embodiment of the present invention;

FIG. 8 shows the 3-bit PUCCH report type 3c according to an second embodiment of the present invention;

FIG. 9 shows RI mapping for PUCCH report type 3c in PUCCH reporting modes 1-1, 2-1 according to the second embodiment of the present invention;

FIG. 10 shows RI mapping for PUCCH report type 3c in PUCCH reporting modes 1-0, 2-0 according to the second embodiment of the present invention;

FIG. 11 shows RI mapping for a 4-bit PUCCH report type according to the second embodiment of the present invention;

FIG. 12 shows RI mapping for PUCCH report type 3a or 3b according to an third embodiment of the present invention;

FIG. 13 shows RI mapping for PUCCH report type 3c according to the third embodiment of the present invention;

FIG. 14 shows RI mapping for PUCCH report type 3a or 3b according to the third embodiment of the present invention;

FIG. 15 shows RI mapping for PUCCH report type 3c according to the third embodiment of the present invention;

FIG. 16 shows a bitmap message according to the third embodiment of the present invention;

FIG. 17 shows RI mapping for a PUCCH report type according to the fourth embodiment of the present invention;

DETAILED DESCRIPTION OF THE EMBODIMENTS

Figures 18, 19:
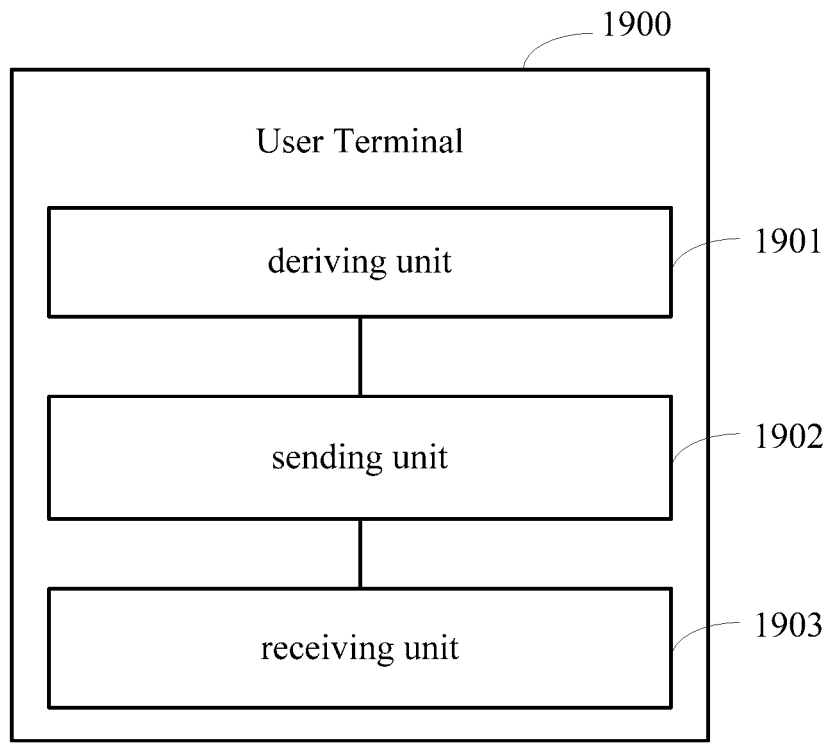
FIG. 18 shows RI mapping for a PUCCH report type according to the fourth embodiment of the present invention.
FIG. 19 shows a user terminal in an embodiment of the invention.

The techniques described herein may be used for various broadband wireless communication systems where a transmitter is equipped with multiple antennas, where some of these antennas may have the same or different polarizations, where a codebook of precoding matrices is known by a transmitter and a receiver, and where that codebook is used for sending feedback information from the receiver to the transmitter via a capacity-limited feedback channel.

In a given connection, a user terminal (receiver) is connected to an access point (transmitter) for a duration typically much longer than the transmission time interval. During this duration, the receiver would most likely feedback an N-bit PMI that belongs to a subset of matrices of a given rank, such that this subset of matrices quantizes the space according to the type of antenna polarization deployed at the transmitter, where 2N is the number of matrices in the codebook for a given rank. The complementary subset of matrices would be reported very infrequently during this time, since it does not match the actual propagation channel characteristics.

In the present invention, it is defined to report in a single message a rank indication, and an indication of the codebook subset dependent on the rank indication, i.e. within the subset of matrices of that rank, such that this codebook subset is in relation to the polarization of the transmit antenna elements, in order to offer better protection to this information and to report it less frequently than the remainder of the matrix index. The remained of the matrix index is reported in at least second message, and it is dependent on both the rank indication and the codebook subset selection indication. The combination of the rank indication, the codebook subset selection indication and the remainder of the matrix index allows to identify a unique matrix in the codebook.

A single bit is needed for reporting the codebook subset according to the polarization. As exemplified with the RI message carried in the PUCCH in LTE Rel-8, this message only needs to be increased by one bit to three bits, offering nearly the same robust encoding as the original Rel-8 RI report of two bits. The remaining N−1 bits can be reported in a PMI that represents the second part of the codebook. The combination of the first (RI) report and the second (PMI) report allows the transmitter to recover the full precoder recommended by the receiver.

Note that here we refer to the first and second reports by the respective denominations or RI and PMI, although the first report may contain rank indication along with information about a first part of the codebook (thus a part of the overall PMI), and the second report may contain only part of the overall PMI pertaining to a second part of the codebook, along with additional information such as CQI (channel quality information) and a subband index.

In an embodiment of the present invention, a method for performing quantized feedback rate adaptation in a wireless communication system is disclosed. Referring to FIG. 2, comprising:

S201, Obtaining, by a user terminal, a reference signal from an access point;

S202, Deriving, by the user terminal, a rank indication, a codebook subset selection indication and a precoding matrix index based on the obtained reference signal;

S203, sending, by the user terminal, a first feedback message conveying the rank indication and the codebook subset selection indication, and sending a second feedback message conveying the precoding matrix index, to the access point; and S204, receiving, by the user terminal, from the access point, data precoded by a matrix derived based on the rank indication, the codebook subset selection indication and the precoding matrix index.

More Detailed description will be made to the present invention in connection with the annexed drawings and embodiments.

First Embodiment

RI reporting formats carrying 1-bit codebook subset selection related to polarization information are provided next, as exemplified in an extension of the PUCCH design of [1].

The format design in FIG. 3 shows the PUCCH report type payload size per reporting mode, where BP is a bandwidth part, and a 3-bit reporting type 3a is introduced. The possible rank indication is limited to the range {1, 2, 3, 4} when the transmitter is equipped with 4 or 8 transmit antenna elements but the receiver is limited to 4-layer spatial multiplexing because the receiver has 4 or fewer receive antennas. Encoding in a fixed size of 3 bits may be enforced with a pre-defined encoding in case of open-loop MIMO (Modes 1-0 and 2-0) in order to keep the encoding bit size fixed for all PUCCH reporting modes using PUCCH reporting type 3a. Note that RI is just a denomination of the report, although the report contains a rank indication and additional information about a first part of a codebook.

Note that in case of open-loop precoding only the rank information needs to be reported. The design could still ensure that the receiver would still be able to provide 1-bit of information about the transmitter antenna polarization without performing codebook search at the receiver. This information, however, would generally already be available at the transmitter, thus reporting 2 bits just for the rank indication seems sufficient in case of open-loop precoding configuration, as shown in FIG. 4 where a hybrid 2-bit and 3-bit reporting type 3b is introduced.

When RI consists of 3-bits of information, i.e., $[o_0^{RI} o_1^{RI} o_2^{RI}]$ with $o_0^{RI}$ corresponding to MSB of 3-bit input and $o_2^{RI}$ corresponding to LSB, the encoding of $[o_0^{RI} o_1^{RI} o_2^{RI}]$ is given by FIG. 5, while the $[o_0^{RI} o_1^{RI} o_2^{RI}]$ to RI mapping is shown in FIG. 6 for PUCCH report type 3a or 3b. For example, $o_0^{RI}$ corresponds to 1-bit of polarization indication, while $o_1^{RI}$, $o_2^{RI}$ correspond to the rank indication.

Alternatively, since for higher ranks the polarization information is less important and the number of matrices in the codebook can generally be smaller in order to achieve acceptable mean quantization error, rank 3 of the codebook could be reported in a single report in the N−1 bits PMI, leading to the RI mapping for PUCCH report type 3a or 3b shown in FIG. 7. The same principle can be used for the rank 4.

It is understood that the ordering of the rank and polarization bits in the encoding of RI in $[o_0^{RI} o_1^{RI} o_2^{RI}]$ is not important, as well as the ordering of the polarization and rank indications in the mapping tables.

In order to keep the RI report content equal to 3 bits in all cases with PUCCH reporting type 3a, it may be desirable to define the encoding of bit $o_2^{RI}$ in case of open-loop precoding (PUCCH reporting modes 1-0 and 2-0). In this case, $o_2^{RI} = (o_0^{RI} + o_1^{RI})$ modulo 2.

Second Embodiment

RI reporting formats carrying 1-bit codebook subset selection related to polarization information are provided next, as exemplified in an extension of the PUCCH design of [1].

The format design in FIG. 8 shows the PUCCH report type payload size per reporting mode, where BP is a bandwidth part, and a 3-bit reporting type 3c is introduced. The possible rank indication is extended to the range {1, 2, 3, 4, 5, 6, 7, 8} when the transmitter is equipped with 8 transmit antenna elements and the receiver has at least 8 receiving antennas.

When RI consists of 3-bits of information, i.e., $[o_0^{RI} o_1^{RI} o_2^{RI}]$ with $o_0^{RI}$ corresponding to MSB of 3-bit input and $o_2^{RI}$ corresponding to LSB, the encoding of $[o_0^{RI} o_1^{RI} o_2^{RI}]$ is shown in FIG. 5, while the $[o_0^{RI} o_1^{RI} o_2^{RI}]$ to RI mapping are shown in FIGS. 9 and 10. In PUCCH reporting modes for closed-loop precoding (modes 1-1 and 2-1), $o_0^{RI}$, $o_1^{RI}$, and $o_2^{RI}$ jointly encode the polarization information and the rank indication. In PUCCH reporting modes for open-loop precoding (modes 1-0 and 2-0) $o_0^{RI}$, $o_1^{RI}$, and $o_2^{RI}$ directly correspond to the rank indication taking values from 1 to 8, without need for further optimization.

For illustration, after reporting RI+PI with 3 bits in PUCCH, the receiver will feedback several PMI+CQI reports using N−1 bits for the PMI, conditioned on the previously reported RI+PI. For an 8 antenna codebook, the codebook structure could be the following according to the mapping in FIG. 9:

ULA rank 1: codebook contains at most 16 DFT beams for ULA

Xpol rank 1: codebook contains at most 8 DFT beams for each polarization

ULA rank 2: codebook contains at most 16 matrices for ULA

Xpol rank 2: codebook contains at most 16 matrices for Xpol

Rank 3: codebook contains at most 16 matrices of rank 3 for Xpol and ULA

Rank 4: codebook contains at most 16 matrices of rank 4 for Xpol and ULA

Rank 5 or 6: codebook contains at most 16 matrices of ranks 5 and 6 for Xpol and ULA Rank 7 or 8: codebook contains at most 16 matrices of ranks 7 and 8 for Xpol and ULA ULA stands for a uniform linear array of antenna elements with the same polarization. Xpol stands for an array of antenna elements where some elements have polarizations orthogonal to each other.

Note that in case of ranks 5 and 6, or 7 and 8, it is assumed that the set of matrices for ranks 5 and 6 can be encoded with N−1 bits in the second report, and the set of matrices for ranks 7 and 8 can be encoded with N−1 bits in the second report. Similarly, we could define a mapping where the set of matrices for ranks 5 to 8 could be encoded with N−1 bits in the second report. In these cases, RI provides only partial rank information, and the complete information about the rank is obtained from the second report in combination with the first report. Note that in very high rank cases (more than 4) in spatially uncorrelated channels, it is likely that the rank of the channel changes according to short-term fast fading statistics rather than with long-term statistics, so reporting the a range of rank information in RI allows more flexibility for fast rank adaptation according to short-term reports for high rank MIMO channels.

It is understood that the RI report could be extent to 4 bits in case the transmitter is equipped with 8 transmit antenna elements, following a principle similar as the case of the extension from 2 bits to 3 bits when the transmitter is equipped with 4 transmit antenna elements. This is illustrated in FIG. 11. A similar straightforward extension could be provided to extend the RI report from 1 bit to 2 bits in case of 2 transmit antennas at the transmitter.

Third Embodiment

RI reporting formats carrying 1-bit codebook subset selection related to information about a double codebook structure are provided next, as exemplified in an extension of the PUCCH design of [1].

Another type of enhanced codebook contains matrices that can be expressed as a product of two matrices, W1 and W2, such that the recommended precoder is W1×W2. Typically the first matrix targets the report of wideband and/or long-term channel state information, while the second matrix targets the report of narrowband (frequency-selective) and/or short-term channel state information. One advantage of this structure is that the first matrix could be used as a stand-alone wideband/long-term precoder, while in combination with the second matrix the precoder can be refined in the frequency/time domain.

For a variety of reasons that will become clear later, the receiver may want to inform the transmitter about the possibility of using only the first matrix W1 as a precoder, while asking the transmitter to ignore the report of W2 or simply informing the transmitter that W2 will not be reported. For example, the receiver may determine that subband/short-term precoder information is unreliable or does not provide any expected gain over the wideband/long-term precoder information, while the reporting mode is not reconfigured by the transmitter. Reporting information about the usage of W1 and W2 would allow the receiver more flexibility in precoding adaptation without any reconfiguration of the reporting mode, thus avoiding disruption of the operation and consumption of expensive resources.

With the definition of a new PUCCH report type 3c for 8-layer spatial multiplexing, and 3-bit encoding of RI as shown in previous embodiments applied as extensions to [1], the mapping of RI bits for PUCCH report could be defined as shown in FIGS. 12 and 13 for a maximum of 4-layer and 8-layer spatial multiplexing (SM), respectively.

It can be noted that wideband/long-term precoding alone is mostly beneficial in spatially correlated channels, so the receiver only needs to report information about the usage of the wideband/long-term precoder for low ranks By exploiting this physical property, it is not necessary to provide the mechanism to report a choice of selecting only one part of the codebook, so W1 and W2 can be conveyed jointly along with the rank information in the PMI for high ranks, or alternatively only one part of the codebook could be reported in a fixed manner for high ranks Thus with a maximum of 8-layer spatial multiplexing, the total reporting size is kept within 3 bits, as if only the rank was reported with values ranging from 1 to 8, thus saving resources and maintaining the coverage of the feedback channel while conveying more information.

An alternative way of expressing the receiver's decision on the recommended precoder could be captured in a recommendation to the transmitter rather than an indication whether or not one part of the codebook is not reported. This is shown in FIGS. 14 and 15, where g(W1,W2) represent the general expression of the overall PMI for the double codebook.

It can be easily recognized that a receiver's precoder recommendation and an indication whether or not some part of the codebook is transmitted in a second report can be conveyed jointly in the first report, rather than separately in the two examples shown in FIGS. 12, 13, 14 and 15; the recommendation of a single part of the codebook meaning that the other part of the codebook is automatically not reported in subsequent reports.

Alternatively, the receiver could provide mode information about the desired precoding vector in a double codebook structure by appending 2 bits to the RI instead of just 1 bit. A bitmap indicates the assumption on the recommended precoder used as assumption in the CQI report as shown in FIG. 16. If bit n set to 1 in the bitmap, it indicates that the receiver assumed the presence of Wn in the precoder as described in the double codebook structure. The double codebook can be described by a general function of W1 and W2 as W=g(W1, W2).

It should be noted that such a bitmap indication could additionally be used at the transmitter to inform the receiver about the possibility of using any or a restricted set of assumptions on the recommended precoder. This types of indication could be useful in scenarios where the transmitter thinks it has better knowledge about the local propagation conditions than the receiver, for example as a collection of statistical samples from a large number of receivers in the same coverage area. Such an indication allows the transmitter to be in control of the range of allowed receiver-based codebook subset selection in the joint report of RI and a first part of the codebook.

Fourth Embodiment

RI reporting formats carrying 1-bit phase alignment information are provided next, as exemplified in an extension of the PUCCH design of [1].

Another type of enhanced codebook contains matrices that can be decomposed into a first part that provides phase alignment in the frequency domain and a second part that contains the remaining quantization information. The frequency domain phase alignment factor (a scalar or vector or matrix) generally targets slowly drifting phase misalignment among transmit antenna elements, typical of an uncalibrated antenna array. The slow drifting is due to changing physical parameters such as equipment temperature, which typically vary much more slowly than the transmission time interval. This is thus a rather static or very long-term channel property of the channel, which needs not be reported very frequently and is thus a good candidate for reporting along with RI. Moreover, 1 or 2 bits are generally sufficient to adjust the phase alignment across antenna elements across a wide bandwidth.

An example of such codebook contains precoding matrices with the following structure:

$$F_{b,n} = \begin{pmatrix} A_b \\ A_b \Lambda_b \Lambda_n \end{pmatrix} = \underbrace{\begin{pmatrix} A_b & 0 \\ 0 & A_b \Lambda_b \end{pmatrix}}_{C_b} \underbrace{\begin{pmatrix} I \\ \Lambda_n \end{pmatrix}}_{W_n}$$

Where $A_b$ is a 4×2 matrix and $\Lambda_b$, $\Lambda_n$ are 2×2 diagonal matrices containing the co-phasing factors between the polarizations, targeting wideband/long-term and narrowband/short-term statistics, respectively. Narrowband/short-term co-phasing factors cope with fast fading, while wideband/long-term co-phasing factors cope with antenna calibration imperfections.

As a special case, such as in [4], the rank-1 codebook may then be written as $$F_{b,n} = \begin{pmatrix} A_b \\ A_b \alpha_b \alpha_n \end{pmatrix} = \underbrace{\begin{pmatrix} A_b & 0 \\ 0 & A_b \alpha_b \end{pmatrix}}_{C_b} \underbrace{\begin{pmatrix} 1 \\ \alpha_n \end{pmatrix}}_{W_n}$$

where $\alpha_n$ is the wideband co-phasing variable, which is a complex scalar from the unit circle. If 1 bit is used to quantize the wideband co-phasing variable to $\{e^{j\Phi_1}, e^{j\Phi_2}\}$, RI and $\alpha_n$ can be jointly encoded in the PUCCH as shows in FIGS. 17 and 18.

Straightforward extensions to co-phasing factors quantized with 2 or more bits can be derived with the same principle, by using 4 or more bits for the jointly encoded report of RI and wideband co-phasing factor. Note that for high transmission ranks the small benefit of wideband precoding justifies not to report a wideband co-phasing factor, as shown in FIG. 18.

It is understandable to those skilled in the art that all or part of the steps of the foregoing embodiments may be implemented by hardware instructed by a computer program. The program may be stored in a computer-readable storage medium. When being executed, the program performs all or part of the steps in foregoing method embodiments.

In another embodiment of the present invention, a user terminal that can realize all the above method is also disclosed. Referring to FIG. 19, the user terminal 1900 includes:

a deriving unit 1901, configured to derive a rank indication, a codebook subset selection indication and a precoding matrix index based on the obtained reference signal from an access point;

a sending unit 1902, configured to send a first feedback message conveying the rank indication and the codebook subset selection indication, and send a second feedback message conveying the precoding matrix index, to the access point;

a receiving unit 1903, configured to receive from the access point, data precoded by a matrix derived based on the rank indication, the codebook subset selection indication and the precoding matrix index.

All functional units in the embodiments of the present invention may be integrated into a processing module, or exist independently, or two or more of such units are integrated into a module. The integrated module may be hardware or a software module. When being implemented as a software module and sold or applied as an independent product, the integrated module may also be stored in a computer-readable storage medium.

The storage medium may be a Read-Only Memory (ROM), magnetic disk or Compact Disk (CD).

Elaborated above are a media content transmission method and a network-side equipment under the present invention. Although the invention is described through some exemplary embodiments, the invention is not limited to such embodiments. It is apparent that those skilled in the art can make modifications and variations to the invention without departing from the scope of the invention. The invention is intended to cover the modifications and variations provided that they fall in the scope of protection defined by the following claims or their equivalents.

REFERENCES

[1] 3GPP TS 36.212: "Evolved Universal Terrestrial Radio Access (E-UTRA); Multiplexing and channel coding"
[2] 3GPP TS 36.213: "Evolved Universal Terrestrial Radio Access (E-UTRA); Physical layer procedures".
[3] R1-101742, Further Refinements of Feedback Framework, Ericsson, 3GPP RAN1, Beijing, China, April 2010.
[4] R1-101959, Further results of DL 8TX codebook, Huawei, 3GPP RAN1, Beijing, China, April 2010.

What is claimed is:

1. A method for performing quantized feedback rate adaptation in a wireless communication system, comprising:
   obtaining a reference signal from an access point;
   deriving, based on the reference signal, a rank indication, a codebook subset selection indication, and a precoding matrix index composed of a first matrix index and a second matrix index;
   sending a first feedback message that conveys the rank indication and the codebook subset selection indication to the access point, wherein the codebook subset selection indication is related to whether a second feedback message contains the first matrix index or the second matrix index, and wherein the codebook subset selection indication is further related to whether a channel quality indication contained in the second feedback message is dependent on the first matrix index on the second matrix index or on both the first and the second matrix index;
   sending the second feedback message that conveys the first matrix index or the second matrix index to the access point; and
   receiving, from the access point, data precoded by a matrix derived based on the rank indication, the codebook subset selection indication and the precoding matrix index.

2. A user terminal, comprising:
   a processor, configured to derive, from a reference signal obtained from an access point, a rank indication, a codebook subset selection indication, and a precoding matrix index-composed of a first matrix index and a second matrix index;

a transmitter, configured to send a first feedback message that conveys the rank indication and the codebook subset selection indication and to send a second feedback message that conveys the first matrix index or the second matrix index to the access point, wherein the codebook subset selection indication is related to whether the second feedback message contains the first matrix index or the second matrix index, and wherein the codebook subset selection indication is further related to whether a channel quality indication contained in the second feedback message is dependent on the first matrix index on the second matrix index or on both the first and the second matrix index; and a receiver, configured to receive from the access point, data precoded by a matrix derived based on the rank indication, the codebook subset selection indication and the precoding matrix index.

3. A method for performing quantized feedback rate adaptation in a wireless communication system, comprising:

obtaining a reference signal from an access point;

deriving, based on the reference signal, a rank indication, a codebook subset selection indication, and a precoding matrix index composed of a first matrix index and a second matrix index;

sending a first feedback message that conveys the rank indication and the codebook subset selection indication to the access point, wherein:

the codebook subset selection indication is related to whether a second feedback message contains the first matrix index or the second matrix index, the codebook subset selection indication is encoded in a bitmap, a first bit indicates presence of the first matrix index in the second feedback message, a second bit indicates presence of the second matrix index in the second feedback message, and the codebook subset selection indication represents one or more values of co-phasing factors;

sending the second feedback message that conveys the first matrix index or the second matrix index to the access point; and receiving, from the access point, data precoded by a matrix derived based on the rank indication, the codebook subset selection indication and the precoding matrix index.

4. A user terminal, comprising:

a processor, configured to derive, from a reference signal obtained from an access point, a rank indication, a codebook subset selection indication, and a precoding matrix index, composed of a first matrix index and a second matrix index;

a transmitter, configured to send a first feedback message that conveys the rank indication and the codebook subset selection indication and to send a second feedback message that conveys the first matrix index or the second matrix index to the access point, wherein the codebook subset selection indication is related to whether the second feedback message contains the first matrix index or the second matrix index, the codebook subset selection indication is encoded in a bitmap, a first bit indicates presence of the first matrix index in the second feedback message, a second bit indicates presence of the second matrix index in the second feedback message, and the codebook subset selection indication represents one or more values of co-phasing factors; and a receiver, configured to receive from the access point, data precoded by a matrix derived based on the rank indication, the codebook subset selection indication and the precoding matrix index.

* * * * *